(12) United States Patent
Tyurina (10) Patent No.: US 8,831,316 B2
(45) Date of Patent: Sep. 9, 2014

(54) POINT SOURCE DETECTION

(75) Inventor: Anastasia Tyurina, Needham, MA (US)

(73) Assignee: Anastasia TyurinaMA (US)

( * ) Notice: Subject to any disclaimer, the term of this patent is extended or adjusted under 35 U.S.C. 154(b) by 318 days.

(21) Appl. No.: 12/511,061

(22) Filed: Jul. 28, 2009

(65) Prior Publication Data

US 2011/0254969 A1     Oct. 20, 2011

Related U.S. Application Data (60) Provisional application No. 61/085,079, filed on Jul. 31, 2008.

(51) Int. Cl.
     *G06K 9/00*             (2006.01)

(52) U.S. Cl.
     USPC ...................................................... 382/129

(58) Field of Classification Search
     USPC ........ 382/128, 129, 133; 702/19, 21; 128/920
     See application file for complete search history.

(56) References Cited

U.S. PATENT DOCUMENTS

| | | | | |
|---|---|---|---|---|
| 5,627,918 A | * | 5/1997 | Carasso | 382/254 |
| 5,737,456 A | * | 4/1998 | Carrington et al. | 382/299 |
| 6,607,274 B2 | * | 8/2003 | Stantz et al. | 351/221 |
| 7,554,750 B2 | * | 6/2009 | George et al. | 359/708 |
| 7,912,307 B2 | * | 3/2011 | Wang | 382/254 |
| 2003/0142877 A1 | * | 7/2003 | George et al. | 382/254 |
| 2005/0259864 A1 | * | 11/2005 | Dickinson et al. | 382/154 |
| 2008/0212830 A1 | * | 9/2008 | Minarik et al. | 382/103 |
| 2010/0080453 A1 | * | 4/2010 | George | 382/162 |

\* cited by examiner

*Primary Examiner* — Jason M Repko
*Assistant Examiner* — Shervin Nakhjavan (57) ABSTRACT

The invention provides a technique for accurate detection of objects appearing in the image, such as single fluorescent molecules, cells, microorganisms, nucleotides, DNA strands, or stars in celestial images. The method allows to differentiate between two combined point sources even if they are closer to each other than the optical resolution of the system. The procedure involves computing several coefficients representing decomposition of the intensity data in the basis of Hermit functions.

21 Claims, 8 Drawing Sheets

POINT SOURCE DETECTION

PARENT CASE TEXT

This application claims benefit of U.S. Provisional Application No. 61/085,079, filed Jul. 31, 2008, which is incorporated in its entirety herein by reference.

TECHNICAL FIELD

The present invention generally relates to image analysis and detection of point sources. A point source object is defined as a diffraction-limited object.

BACKGROUND INFORMATION

Image analysis often requires a determination of whether an observed point source object is a single object or whether it is made up of several overlapping or blended objects. When objects in an image are spaced closer together than the resolving power of the optics, several closely spaced objects can erroneously appear as one large object.

Software exists to process electronic (i.e., digitized) representations of images. The processing includes operations performed on the digital image data to effectively increase the resolution of the image and attempt to minimize or eliminate image artifacts. An example is a software application called Source Extractor, which is used to process and deblend astronomical images. Deblending is the process of attempting to determine whether an observed object is a single object or a collection of closely-spaced, but separate objects.

Deblending in Source Extractor is performed by examining an intensity profile of the objects appearing in an image and comparing that profile to a threshold. This is described in, for example, B. W. Holwerda, Source Extractor for Dummies 32-34 (Space Telescope Science Institute, Baltimore, Md.) and also in E. Bertin, SExtractor v2.3 User's Manual 20-22 (Institue d'Astrophysique & Observatoire de Paris). This technique in accordance with the Rayleigh criterion is generally unable to resolve individual objects that are closer than about 1.5 times their full-width half-max (FWHM). FWHM is an important measure of the quality of an imaging device and its spatial resolution. If the distribution is Gaussian, then the FWHM can be calculated as $FWHM = 2*\sqrt{-2*\log(0.50\sigma)}$, where $\sigma$ is the standard deviation, or the square root of the variance. FWGM is also the bandwidth of the system. The Rayleigh criterion is the generally accepted criterion for the minimum optically resolvable detail.

SUMMARY OF THE INVENTION

The invention generally relates to image processing techniques that improve the resolution of point source objects appearing in an image. The improved images can then be used in further analysis. In accordance with one aspect of the invention, images containing point source objects arranged very close together are processed, and individual point source objects are distinguished from clusters of objects. In a further aspect of the invention, the method is suggested that allows to differentiate two combined point sources from a single one even if they are closer to each other than the optical resolution of the system. For the purposes of this invention, a point source object is defined as a diffraction-limited object that is an object of a physical size less than a diffraction of light in the optical system, and which has then a size and a point spread function defined by the parameters of the optical system.

In one embodiment of the invention, single molecules labeled with an optically-detectable reporter are detected. The increased accuracy and resolution provided by the invention reveals previously undetected or misdetected single objects.

The present invention provides, in one aspect, methods and apparatus for facilitating the accurate detection of objects appearing in an image, such as single fluorescent molecules, or stars in astronomy related images, or fluorescing cells, or micro organisms. The invention provides resolution of closely-spaced objects without the need to perform intensive, time-consuming computations and can be applied in all areas of science and industry, such as medicine, biotechnology, microscopy, remote sensing, astronomy, defense, material science, manufacturing, security, robotics, and document processing, to name just a few.

Embodiments of the invention are useful to detect single objects appearing in a dense field of objects. In particular, the method of the invention may be used in astronomy when analysis of digital images from a telescope is performed. Stars are diffraction limited objects for any possible magnification, which makes them point sources of predicted size FWHM and $\sigma$, and Gaussian point spread function. Further, the method may be successfully employed in microscopy of diffraction limited florescent entities such as florescent cells or florescent microorganisms under magnification not sufficient to see them in detail. The cells are then diffraction limited objects making them point sources of predicted size, $\sigma$, and Gaussian point spread function.

Additionally, the method is highly useful in microscopy of florescent molecules. As the molecules are so small, they are diffraction-limited objects under any magnification, and they are always point sources. For example, nucleotides or DNA strands or pieces of strands with florescent dies attached to them are diffraction-limited objects. They are then point sources of predicted size, $\sigma$, and Gaussian point spread function.

In one particular embodiment according to the invention, a method of image analysis includes providing a representation of a sample image that contains intensity and centroid (coordinates of object centers) information data for objects in the image. A post-processing procedure is performed on representation, which involves computing several coefficients representing decomposition of the intensity data in the basis of Hermit functions. These Hermit decomposition coefficients allow the characteristics (e.g. position and intensity) of the sample objects to be computed. The number of coefficients of decomposition that are computed depends upon the number of objects that one wishes to resolve, as taught below.

In a particular alternative aspect, methods of the invention are used to detect the incorporation of single fluorescent-labeled nucleotides into a single surface-bound nucleic acid duplex in a template-directed sequencing-by-synthesis reaction.

Other aspects and advantages of the present invention will become apparent from the following detailed description, taken in conjunction with the accompanying drawings, illustrating the principles of the invention by way of example only.

Figure 1:
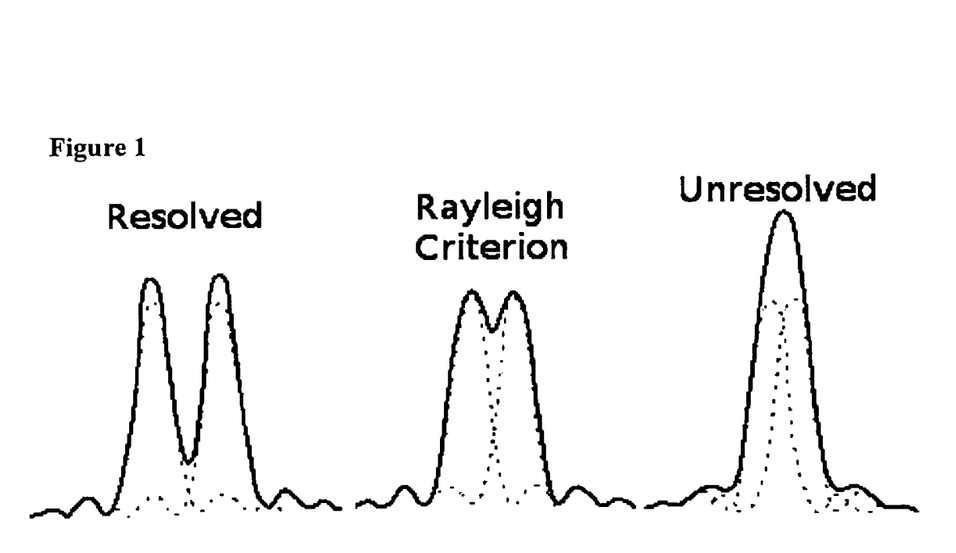
FIG. 1 shows the limits of resolution of common methodology, known as the Rayleigh criterion.

FIG. 1 shows the limits of resolution through a common methodology, known as Rayleigh criterion.

Figure 4:
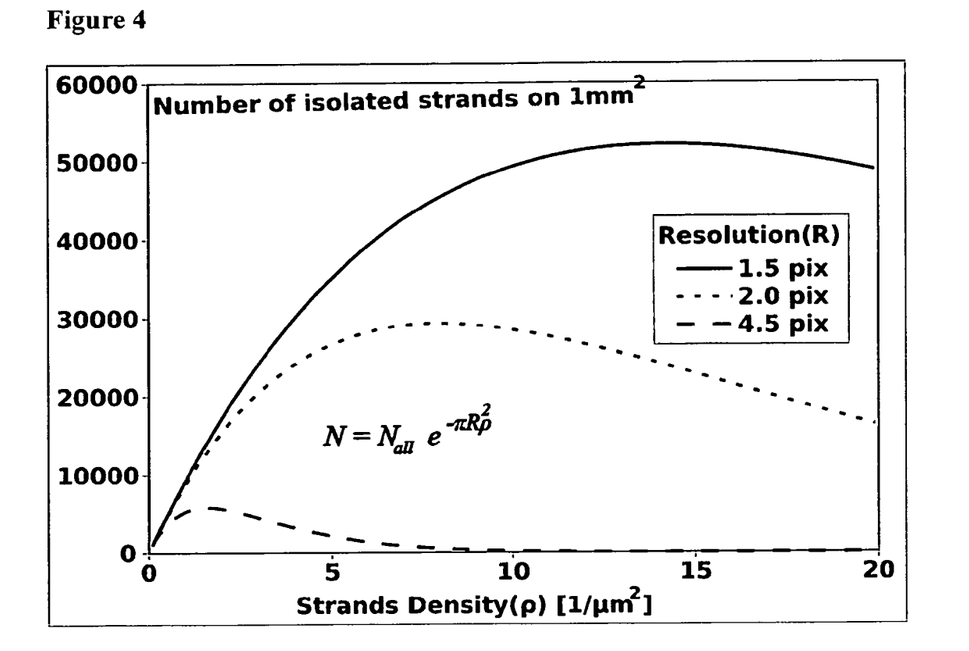
FIG. 4 shows a dependence of yield of accurately detected objects on density of randomly distributed objects for different resolution capabilities of detection apparatus.

FIG. 4 shows a dependence of yield of accurately detected objects on density of randomly distributed objects. Different curves correspond to different resolution capabilities of detection apparatus. The 4.5 pix resolution corresponds to the capabilities of the common methodology, and 1.5 pix resolution curve represents the capabilities of the embodiment of the invention. The maximum value of every curve represents the maximum possible yield of objects for the given resolution capability of detection. The observable improvement in the yield is 10 fold.

Figure 7:
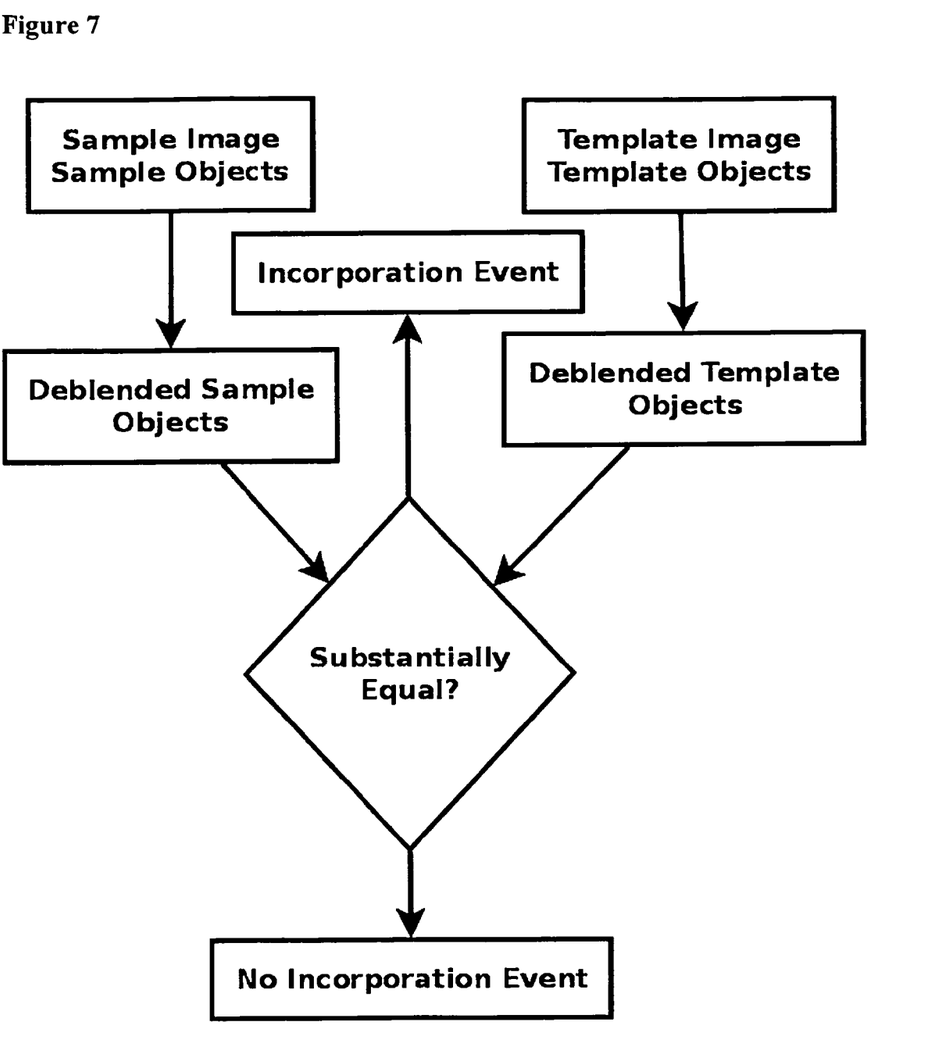
FIG. 7 shows that in the context of DNA sequencing, embodiments of the invention are used to identify the incorporation into a template/primer duplex of a single, labeled nucleotide at a discrete location on a surface.

As shown in the drawings of FIG. 7 for the purposes of illustration, the invention may be embodied in methods and apparatus for analyzing images acquired during DNA sequencing. Embodiments of the invention are useful for minimizing or eliminating image artifacts that compromise the accuracy of detection. Application of methods of the invention to nucleic acid sequencing is used to demonstrate the utility of the invention. The skilled artisan understands that the principles of the invention are useful in any application in which high-resolution single object detection is desired, including applications involving diffraction limited or other symmetrical objects.

Figure 5:
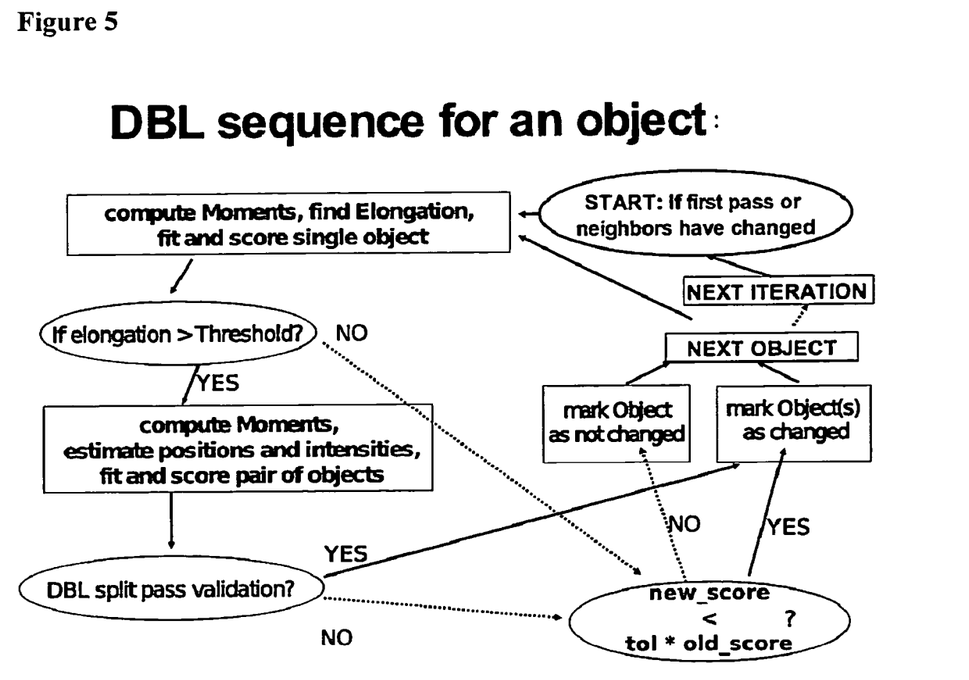
FIG. 5 is a flowchart depicting a method for image analysis in accordance with an embodiment of the invention.

In brief overview, FIG. 5 is a flowchart depicting a method for image analysis in accordance with an embodiment of the invention.

FIG. 7 shows that in the context of DNA sequencing, embodiments of the invention are used to identify the incorporation into a template/primer duplex of a single, labeled nucleotide at a discrete location on a surface. The basic process includes attaching nucleic acid duplex (comprising a template hybridized to a primer) to a surface, such as glass or fused silica (the specific type of surface is immaterial to the present invention, but should be selected to be compatible with the type of label used). The attached duplex is then exposed to an optically-labeled nucleotide that hybridizes to the next available nucleotide in the template (available meaning just 3' of the template terminus) and a polymerizing enzyme capable of incorporating the labeled nucleotide into the primer. Incorporation is determined by observing the optically-detectable label at the known location of the duplex. For example, if the optically-detectable label is a fluorescent label, then illumination at the appropriate wavelength is used to stimulate fluorescence of the label. The invention allows one to determine whether a single optically-labeled nucleotide has been incorporated or whether there are multiple duplexes, non-specific label, dirt, etc. that overlap.

Figure 3:
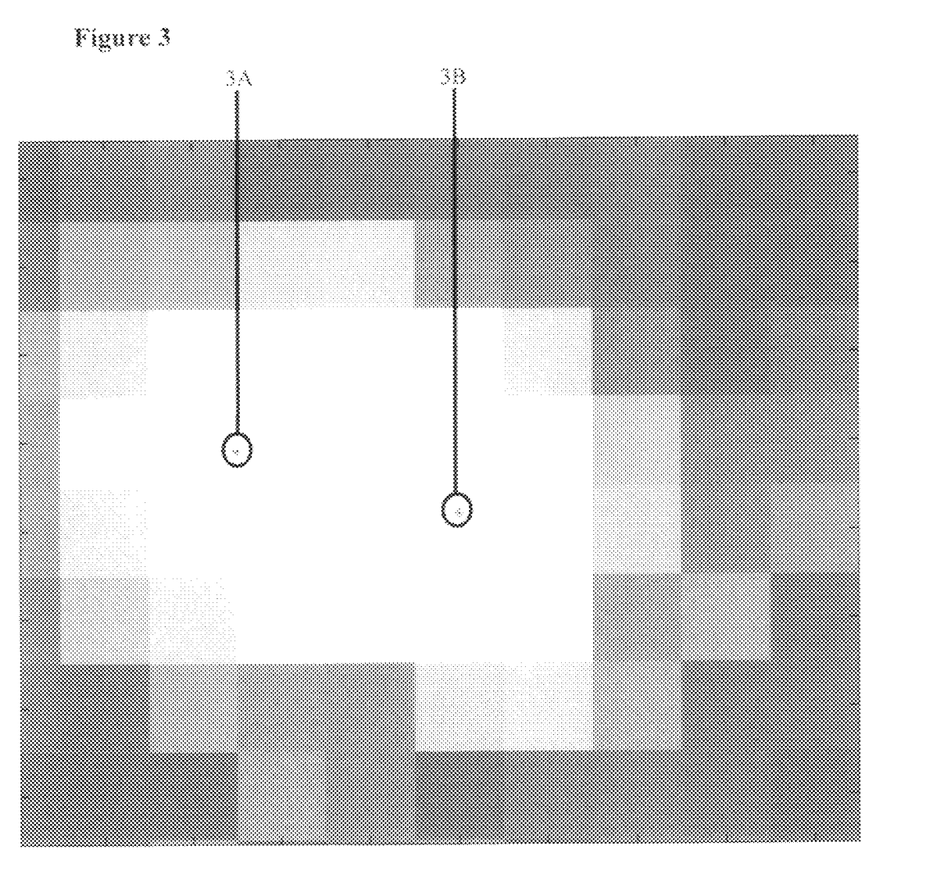
FIG. 3 shows a point spread function of two point source objects (3A and 3B) blended as a result of limitations on image resolution.

FIG. 3 shows how defects in the testing apparatus and limitations on image resolution can hide or misidentify single fluorescent objects 3A and 3B, thereby compromising the accuracy of the data.

Figure 6:
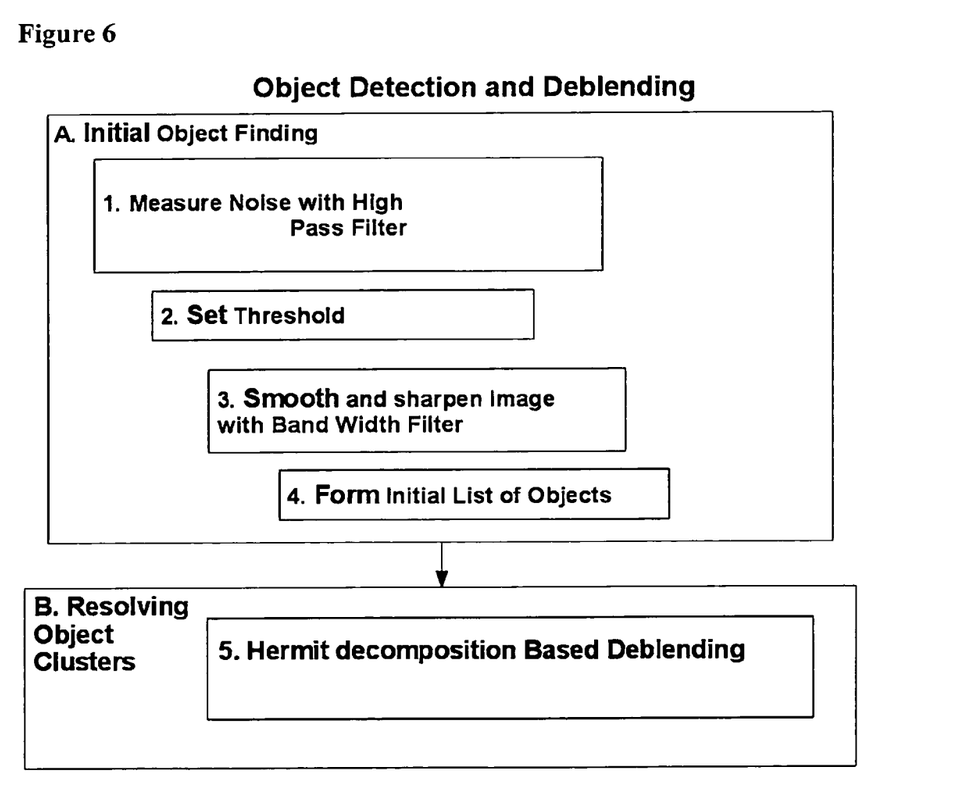
FIG. 6 shows a possible software apparatus based on the embodiment of the invention used to detect point source objects present in an image.

FIG. 6 shows that in embodiments of the invention, an image is acquired using, for example, a personal computer with an image capture card. The image is recorded in one or more electronic files, typically in the SPE or TIFF or FITS format. A photometry program then operates on these files. One such program is Source Extractor, which is typically used in astronomical studies. The photometry program detects the intensities and locations of the fluorescence (i.e., the template objects) and generates a representation of the image that includes a table or catalog containing intensity data and the centroids of the objects. The intensity data generally follow a Gaussian distribution, and the centroids are typically the coordinates of the centers of the identified objects.

A problem with the representation of the image (FIG. 3) is that photometry programs generally have a limited ability to identify or resolve a number of closely spaced objects. For example, the photometry programs can erroneously interpret two discrete, closely spaced objects as single large object. This can occur if the objects are closer than approximately 1.5 FWHM (full-width at half-max) of the point source objects, which measures about 4 pixels on the figure. To minimize or eliminate this problem, embodiments of the invention subject the representation of the image of FIG. 3 to post-processing, potentially identifying cluttered objects.

As shown in FIG. 5, this post-processing examines the intensity data (collectively, the intensity flux), and computes several coefficients of Hermit decomposition of the intensity flux. A result is a series of equations that are solved simultaneously to yield a template parameter that, in some embodiments, includes corrected values for the centroids. The corrections have the effect of revealing locations of additional objects that were unresolvable with the common technologies.

FIG. 5 is a flowchart depicting one possible method for such post-processing in accordance with an embodiment of the invention. A representation of the image includes, as described above, intensity data and centroids of the fluorescing objects therein. The fluorescing objects generally appear in a constellation-like form. When the representation of the image includes many large and closely spaced fluorescing objects, as shown in illustration FIG. 3, the post-processing operates to minimize or eliminate artifacts that could prevent a proper analysis.

BRIEF DESCRIPTION OF THE DRAWINGS

FIGS. 2.1 and 2.2 each shows a point-spread function, to which two proximate objects have contributed.

DETAILED DESCRIPTION

Figure 21:
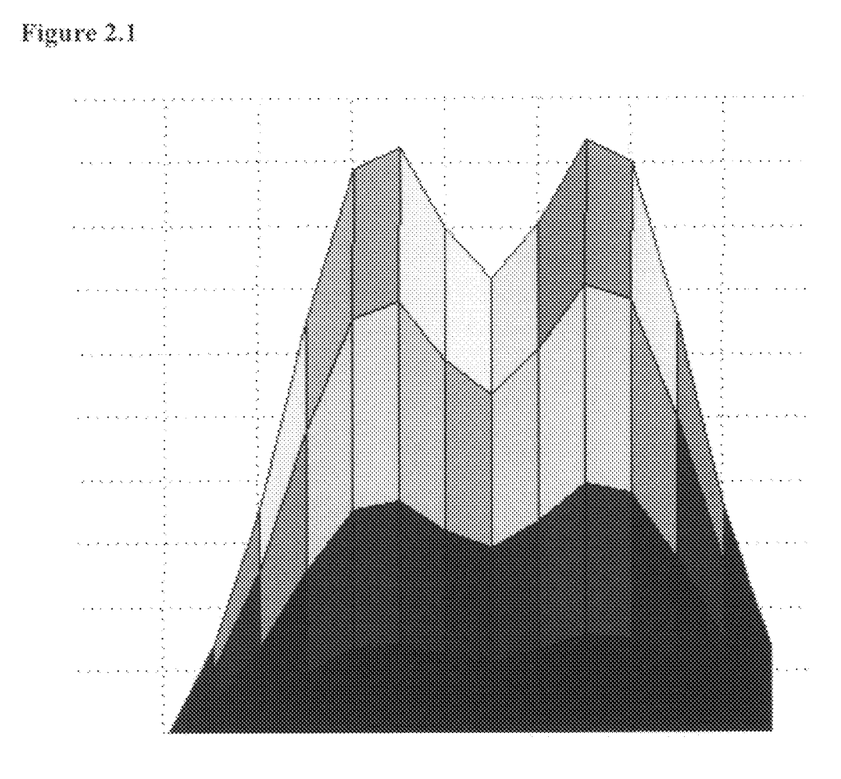
Figure 22:
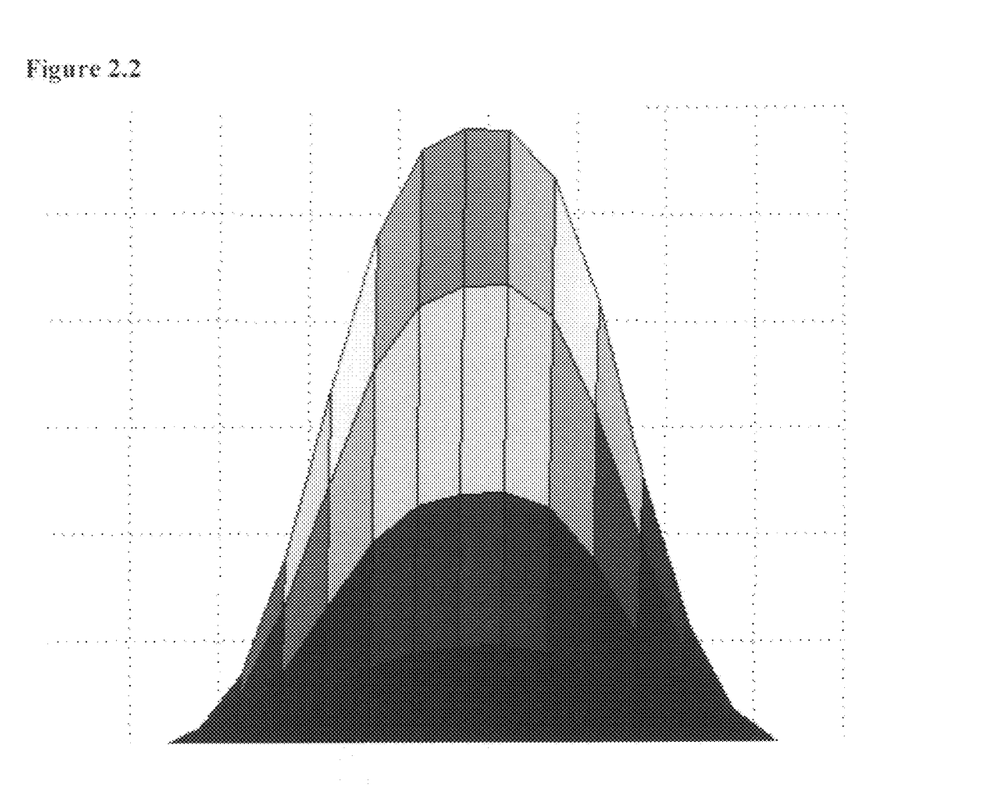

In the method of the current invention, a point spread function is used to characterize the intensity of the point source. In a digital image of point sources, a point spread function of a source located in (x1,y1) is described by Gaussian:

$$F(x, y) = \frac{F}{\pi\sigma^2} e^{\frac{-(x-x_1)^2-(y-y_1)^2}{2\sigma^2}} \qquad \text{Eq. 1}$$

where F is the intensity of the source and $\sigma$ is a size-parameter defined by optics that produced the digital image. For the purposes of this application, we define the optical resolution of the system, $\rho$, as a minimal distance between the two point sources that allow for the optical resolution of the two sources. The point sources are considered optically resolved if a point spread function has a minimum point between them. The resolved and unresolved sources are exemplified in FIG. 1. Let's consider FIG. 2.1 and FIG. 2.2. In FIG. 2.1 two point sources are located at a distance d, d>$\rho$, where $\rho$ is an optical resolution. In FIG. 2.2, two point sources are located at a distance d, d<ρ. Consider F(x,y) a point spread function (pixel intensities) presented in FIG. 2.2. It is described by a combined point spread function of the 2 sources located in (x1,y1) and (x2,y2):

$$F(x, y) = \frac{F_1}{\pi\sigma^2} e^{\frac{-(x-x_1)^2-(y-y_1)^2}{2\sigma^2}} + \frac{F_2}{\pi\sigma^2} e^{\frac{-(x-x_2)^2-(y-y_2)^2}{2\sigma^2}} \quad \text{Eq. 2}$$

The method of the current invention allows to differentiate two combined point sources from a single one even if they are closer to each other than optical resolution of the system. The method accurately positions the sources by computing $f_i$ coefficients of decomposition of the point-spread function on a basis $H_i$ of Hermit functions:

$$F(x, y) = \sum_{i=0}^{i=\infty} (\langle F(x, y) * H_i(x, y)\rangle H_i(x, y)) = f_i * H_i(x, y) \quad \text{Eq. 3}$$

Hermit functions are an orthogonal basis in a functional space of integrable functions and they are, $$H_i(x, y) = h_i(x, y) e^{((-(x-x_0)^2-(y-y_0)^2)/2\sigma^2)}, \quad \text{Eq. 4}$$

Where $(x_0, y_0)$ is the centroid of the original and possibly combined object and $h_i(x,y)$ is a Hermit polynomial in 2 variables.

If the basis of polynomials $\{1, x, yx^2, xy, y^2, x^3, x^2y, xy^2, y^3, \ldots\}$ was used instead of Hermit functions, which are polynomial multiples of a Gaussian, the decomposition coefficients would have been moments:

definition: Moment$(i+k, i, k) = Mi, k = \iint x^i y^k F(x,y) dx dy$

However, the representation or decomposition in Hermit basis is more powerful then a polynomial representation. It delivers a less noise dependent solution due to fast convergence of the Gaussian to 0 with increasing distance from origin. The solution based on Hermit function decomposition would also address some other problems besides the resolution. For instance, the polynomial moments augment the dependency of the data on the random noise present in digital images while Hermit decomposition coefficients suppress it and thus make the method more resilient to noise. Also Hermit decomposition coefficients allow for automatic scaling of relative intensities of blended objects. It is also called in literature a product with Gaussian measure or weighted product (these coefficients of decomposition are a scalar product of a point spread function F(x,y) and the functions of a basis such as polynomial, Hermit functions etc).

Resilience to noise is an important advantage of Hermit functions representation that allows dispensing with a computationally intense verification step such as fitting (Non-Linear Least Square fitting). This leads to a significant improvement in speed and potentially cost of the processing of the method of the invention over any method that has to employ fitting. In a situation when speed of the processing is a limiting factor it can lead to significant savings in cost due to less hardware equipment (CPU) needed in the processing apparatus. One of the examples of the processing time limited application is image processing done in real time without saving the images. The range of savings in processing time or hardware cost may differ from 10 times to 1000 times depending on object density and image quality.

If F(x,y) is a combined point-spread function of 2 point sources (x1,y1) and (x2,y2), of intensities F1 and F2 correspondingly, then F(x,y) is a sum of point spread functions of single sources (Eq. 2). F(x,y) can be decomposed over the Hermit function basis, and the coefficients of that decomposition $f_i$ will be defined by F1,F1,x1,y1,x2,y2 and σ. However, σ is defined by the optical system and is a known value in that system of equations.

Therefore, to define a two-point-source combination, 6 unknowns need to be found, namely, 2 intensities and 4 (x,y) coordinates. Six equations are described below that define the coefficients of decomposition through F(x,y), the pixel intensities in the image. These values of $f_i$ are set equal to their predicted value defined through the theoretical form of F(x,y) as combination of two point sources (Eq.2) decomposed over Hi basis. The system of equations then is solved to obtain numerical values for F1, F1, x1, y1, x2, y2 If the values of intensities and coordinates thus defined are physically meaningful, that constitutes a solution for two closely standing separate sources, otherwise the source is called a single point source.

We will choose the first 6 Hermitian functions to get the equations to connect the specific data from the image to a theoretical formula expressing that value through the unknown F1 and F2 and x1, x2, y1, y2. The solution of this system of equations for F-s and (xy)-s will provide the coordinates and intensities of the point sources of interest. The first of the basic Hermit functions are:

1) $H_0 = e^{(-(x-x_0)^2-(y-y_0)^2)/2\sigma^2}$      Eq.6

2) $H_{1,0} = x e^{(-(x-x_0)^2-(y-y_0)^2)/2\sigma^2}$      Eq.7 and for y:

3) $H_{0,1} = y e^{(-(x-x_0)^2-(y-y_0)^2)/2\sigma^2}$      Eq.8

4) $H_{2,0} = (x^2-1) e^{(-(x-x_0)^2-(y-y_0)^2)/2\sigma^2}$      Eq.9

5) $H_{1,1} = (xy) e^{(-(x-x_0)^2-(y-y_0)^2)/2\sigma^2}$      Eq.10

6) $H_{0,2} = (y^2-1) e^{(-(x-x_0)^2-(y-y_0)^2)/2\sigma^2}$      Eq.11

Therefore the first decomposition coefficients for a point spread function F(x,y) are:

1) $f_0 = \iint F(x,y) * e^{(-(x-x_0)^2-(y-y_0)^2)/2\sigma^2} dx dy$      Eq.12

2) $f_{1,0} = \iint F(x,y) x e^{(-(x-x_0)^2-(y-y_0)^2)/2\sigma^2} dx dy$      Eq.13 and for y:

3) $f_{0,1} = \iint F(x,y) y e^{(-(x-x_0)^2-(y-y_0)^2)/2\sigma^2} dx dy$      Eq.14

4) $f_{2,0} = \iint F(x,y)(x^2-1) e^{(-(x-x_0)^2-(y-y_0)^2)/2\sigma^2} dx dy$      Eq.15

5) $f_{1,1} = \iint F(x,y)(xy) e^{(-(x-x_0)^2-(y-y_0)^2)/2\sigma^2} dx dy$      Eq.16

6) $f_{0,2} = \iint F(x,y)(y^2-1) e^{(-(x-x_0)^2-(y-y_0)^2)/2\sigma^2} dx dy$      Eq.17

These are values of coefficients $f_i$ computed from the image data.

From the functional characteristics of F(x,y) (Eq.2) the same $f_i$ values can be computed as follows:

1) $f_0 = F_1 e^{-x^2/4\sigma^2} + F_2 e^{-x2^2/4\sigma^2}$      Eq.19

2) $f_{1,0} = F_1(x_2/2) e^{-x^2/4\sigma^2} + F_2(x_2/2) e^{-x2^2/4\sigma^2}$      Eq.20

3) $f_{0,1} = F_1(y_1/2) e^{-x^2/4\sigma^2} + F_2(y_2/2) e^{-x2^2/4\sigma^2}$      Eq.21

4) $f_{2,0} = F_1(\sigma^2+3/4 x_1^2) e^{-x^2/4\sigma^2} + F_2(\sigma^2+3/4 x_2^2) e^{-x2^2/4\sigma^2}$      Eq.22

5) $f_{1,1} = F_1(\sigma^2 + 3/4 x_1 y_1) e^{-x^2/4\sigma^2} + F_2(\sigma^2 + 3/4 x_2 y_2) e^{-x^2/4\sigma}$  Eq.23

6) $f_{0,2} = F_1(\sigma^2 + 3/4 y_1^2) e^{-x^2/4\sigma^2} + F_2(\sigma^2 + 3/4 y_2^2) e^{-x^2/4\sigma^2}$  Eq.24

Additionally, flux and centroid information can be used:

$$\text{flux}(F(x,y)) = \iint F(x,y) dx dy = F_1 + F_2 = M_0 \quad \text{Eq.25}$$

and centroid (coordinate of center of mass)

$$0 = x_1 * F_1 + x_2 * F_2 \quad \text{Eq.26}$$

in a system of coordinates (x,y) with the origin of $x_0$, $y_0$, the center of mass of the point spread function $F(x,y)$.

When the system of equations (1 to 6), is solved algebraically it can be assumed that $$e^{-x_2^2/2\sigma^2} \approx 1 - (x_2^2/4\sigma^2) \quad \text{Eq. 27}$$

because, as we are considering the case of optically unresolved and thus sufficiently close pair of sources, it is implied, that the sources distances $x_i$ from the center of mass are less than $\sigma$ times $\sqrt{2}$. Therefore, $x_i^2/2\sigma^2 < 1/2$, and the approximation applies with enough accuracy.

The system of equations 19-27 can be solved as follows: from Eq. 19 and Eq. 27:

$$f_0 = F_1(1 - x_1^2/4\sigma_2) + F_2(1 - x_2^2/4\sigma) = (F_1 + F_2) - (F_1 * x_1^2 + F_2 * x_2^2)/4\sigma$$

since $$F_1 + F_2 = M_0$$

and $$(F_1 + F_2) - (F_1 * x_1^2 + F_2 * x_2^2)/4\sigma^2 = M_0 + F_1 * x_1(x_1 + x_2)/4\sigma^2 \quad \text{Eq. 28}$$

and $$(M_0 + f_0) 4\sigma^2 = F_1 * x_1 (x_1 + x_2) \quad \text{Eq. 29}$$

from Eq. 20 and Eq. 27:

$$f_{1,0} = F_1 * x_1/2 * e^{(-x_1^2/4\sigma^2)} + F_2 * x_2/2 * e^{(-x_2^2/4\sigma^2)} = F_1 * x_1 * (e^{(-x_1^2/4\sigma)} - e^{(-x_1^2/4\sigma^2)} - e^{(-x_2^2/4\sigma^2)}) 2 f_{1,0} \approx (x_1 - x_2)(x_1 + x_2) * F_1 * x_1/4\sigma^2 \quad \text{Eq. 30}$$

Combining Eq.28 and Eq. 30, it can be observed that:

$$2 f_{1,0} \approx (x_1 - x_2)(f_0 + M_0)/4\sigma^2 \quad \text{Eq. 31}$$

and $$x_1 - x_2 = 2 f_{1,0} * 4\sigma^2/(f_0 + M_0) \quad \text{Eq. 32}$$

therefore $$x_1 + x_2 = x_2 - x_1 + 2 x_1 = f_{1,0} * 4\sigma^2/(f_0 + M_0) + 2 x_1 \quad \text{Eq. 33}$$

and $$2 F_1 x_1^2 + F_1 * 2 f_{1,0} * 4\sigma^2/(f_0 + M_0) * x_1 - 4\sigma^2(f_0 + M_0) = 0 \quad \text{Eq. 35}$$

Eq. 35 is a quadratic equation in $x_1$ and allows for a solution $$x_1 = 1/4 F_1 \left( -8 F_1 f_{1,0} \sigma^2 / (f_0 + M_0) + \sqrt{64 F_1^2 f_{1,0}^2 / (f_0 + M_0)^2 + 16 (2 F_1) \sigma^2 (f_0 + M_0)} \right) \quad \text{Eq. 36}$$

and, by symmetry, the other root of Eq. 35 is $x_2$:

$$x_2 = 1/4 F_1 \left( -8 F_1 f_{1,0} \sigma^2 / (f_0 + M_0) - \sqrt{64 F_1^2 f_{1,0}^2 \sigma^4 / (f_0 + M_0)^2 + 16 (2 F_1) \sigma^2 (f_0 + M_0)} \right) \quad \text{Eq. 37}$$

Now when $x_1$ and $x_2$ have been found, Eq. 26 allows to find:

$$F_1 x_1 = x_2 (M_0 - F_1)$$

$$F_1 = M_0 x_2 / (x_1 + x_2)$$

$$F_2 = -F_1 x_1 / x_2 \quad \text{Eq.38-40}$$

Thus $x_1$, $x_2$, $F_1$, $F_2$ have all been found.

A list of detected objects in the final representation of the image lacks many of the image artifacts present in the initial representation of the image. In particular, blended pairs of two fluorescing objects appear resolved as singles, and their positions and intensities are accurately detected. Before applying the method that is the embodiment the invention, many closely spaced pairs of fluorescing objects would be erroneously rendered as single large objects, and their coordinates would be called as centers of mass of blended objects. These centers of mass of blended objects may be far from the centers of the actual objects the blended object consists of. The error in centroid (position of the object) determination may result in an erroneous answer to a question "was there an object located in certain location or vicinity?", thereby preventing a proper analysis of, for example, chemical incorporations in DNA sequencing.

The post-processing of a blended object after subtracting the effect of detected objects from the image data, and computing new centroids by the calculation of decomposition coefficients can be performed several times. In theory, repeating the process will refine the image data, thereby reducing artifacts and allowing for the resolution of more (e.g., three or greater) closely spaced objects.

In brief overview, the image analysis apparatus in accordance with of the invention includes an image capture subsystem that acquires images of fluorescing objects (i.e., molecules or cells or stars), digitizes them, and generates corresponding optical data that can be stored in computer files, typically in the SPE or TIFF or FITS format. A software code processes the optical data and generates field pattern data that includes original centroids of the fluorescing objects.

Further, software code based on the algorithm of the current invention processes the optical data, or the field pattern data, or both, computes the coefficients of Hermit decomposition of the intensity data corresponding to each fluorescing object, and generates a replacement field data pattern. From the computation of the coefficients of Hermit decomposition, the software code based on the algorithm of the current invention also calculates replacement centroids. The apparatus of the invention can repeat this process any number of times to refine the data.

Additionally, the software code based on the algorithm of the current invention determines if any of the original centroids should be replaced by two or more replacement centroids. This can occur when, for example, the coefficients of Hermit decomposition suggest that what was thought to be a single fluorescing object is actually two (or more) closely spaced fluorescing objects, each having its own centroid. For example, compare the residual light of the image with a two centroid configuration with a residual of the image with a single centroid configuration. Choose the hypothesis on a number of objects (one or two) that leads to less residual.

Further, the method and apparatus of the current invention may be advantageously used for the purposes of experiment optimization in any type of assay involving fluorescent entities, such as microbiological, cellular, nucleic acid or any other assay. By allowing much better resolution of the point source objects, it becomes possible to considerably increase the density and the output of such assays. As shown on FIG. 4. application of the method of the embodiment of the invention increased the maximum possible output of accurately detected objects by a factor of 10 while resolution of that particular optical system improved from 4.5 pixels to 1.5 pixels. That is an example of the effect of the application of the method compared to the common methodology.

Though the components of the apparatus of the current invention are described throughout this application as separate entities, in actual implementations of the invention, however, they may be inseparable components of other electronic devices such as a digital computer. Thus, actions described above may be implemented in software that may be embodied in an article of manufacture that includes a program storage medium. The program storage medium includes, for example, data signals embodied in one or more of a carrier wave, a computer disk (magnetic, or optical (e.g., CD or DVD), or both), non-volatile memory, tape, a system memory, and a computer hard drive.

From the foregoing, it will be appreciated that methods and apparatus according to the invention afford a simple and effective way to analyze images used in DNA sequencing or in any other application where images must be examined or compared with accuracy and can be difficult to obtain due to, for example, defects in the testing apparatus and/or limitations on image resolution.

The invention may be embodied in other specific forms than what is particularly disclosed herein without departing from the spirit or scope of the invention. The foregoing disclosed embodiments are in all respects illustrative rather than limiting on the invention.

What is claimed is:

1. A method for resolving and identifying diffraction limited point source objects in an image, the method comprising the steps of: (a) picking an object in an image; (b) computing coefficients of decomposition of a point-spread function of said object(s) on a an orthogonal basis of functions; (c) formulating two competing hypotheses, wherein the first hypothesis states that the object represents a single point-source, and the second hypothesis states that the object represents a pair of proximate point-sources; (d) for two competing hypotheses, equating the coefficients of decomposition of step (b) with the coefficients of decomposition derived analytically from the Gaussian models of the two hypotheses; (e) solving each of the two sets of equations in close terms for intensity and position of the point sources; (f) calculating residual light; (g) selecting the hypothesis with minimal residual light.

2. The method of claim 1, wherein said step (g) includes determining whether said set of coefficients is more closely associated with a single point source or with a pair of point sources.

3. The method of claim 1, wherein in step (d) for each of the hypotheses the point source coordinates and intensities are derived from the decomposition coefficients.

4. The method of claim 1, wherein a model point spread function is constructed for each hypothesis.

5. The method of claim 4, wherein in step (f) the residual light is computed for the point spread function of the object in the image, and for the model point spread functions corresponding to each of the hypothesis.

6. The method of claim 4, wherein, in step (g), the hypothesis is accepted if the residual light is minimized by the model point spread function associated with it.

7. The method of claim 1, wherein said functions are Hermit functions.

8. The method of claim 1 wherein said object comprises two point sources.

9. The method of claim 1, wherein said image is generated through digital light detector.

10. The method of claim 9, wherein said detector is a telescope.

11. The method of claim 10, wherein said image is an image of stars.

12. The method of claim 9, wherein said detector is a microscope.

13. The method of claim 12, wherein said image is an image of a diffraction limited fluorescent entities.

14. The method of claim 13, wherein said entities are selected from cells; single molecules; nucleotides; polynucleotides; nucleic acid strands, and combinations thereof.

15. The method of claim 13, where the image is generated during a nucleic acid sequencing.

16. The method of claim 13 wherein said image is generated during an incorporation of a fluorescent labeled nucleotide into a surface-bound nucleic acid duplex.

17. The method of claim 12 wherein said image is an image of molecules labeled with an optically-detectable reporter.

18. Image analysis apparatus for use in a single point light source detection system comprising: (a) an image capture system for receiving optical information; (b) a CPU configured to execute the algorithm identifying point sources, performing a determination of a number of sources contributing to an observed point spread function and determining the point source(s) position and intensity; and presenting the information about an image as a list of positions and intensities of the point sources detected in the image, wherein said determination is based on computing coefficients of decomposition of a point-spread function of said source(s) on an orthogonal basis of functions.

19. The apparatus of claim 18, wherein said single point light source is selected from a star and a diffraction limited fluorescent entity.

20. The apparatus of claim 19 wherein said diffraction limited fluorescent entity is selected from a fluorescent molecule, a fluorescing cell, a fluorescing microorganism, a nucleotide, a fluorescing DNA strand, a fluorescing piece of the DNA strand and combinations thereof.

21. The apparatus of claim 18 wherein said single point light source is a molecule labeled with an optically-detectable reporter.

* * * * *